United States Patent [19]
Van De Berg

[11] Patent Number: 5,907,812
[45] Date of Patent: May 25, 1999

[54] METHOD AND ARRANGEMENT FOR SPECTRUM SHARING IN A RADIO COMMUNICATION ENVIRONMENT

[75] Inventor: Petrus Hubertus Gerardus Van De Berg, Amsterdam, Netherlands

[73] Assignee: Telefonaktiebolaget LM Ericsson, Stockholm, Sweden

[21] Appl. No.: 08/567,582

[22] Filed: Dec. 5, 1995

[30] Foreign Application Priority Data

Dec. 7, 1994 [EP] European Pat. Off. .............. 94203561

[51] Int. Cl.$^6$ ...................................................... H04Q 7/38
[52] U.S. Cl. ......................... 455/461; 455/426; 455/450
[58] Field of Search ................................... 455/426, 450, 455/451, 452, 454, 464, 62, 63, 67.1, 501, 67.3, 552, 76, 455, 462; 331/176; 370/280; 375/222

[56] References Cited

U.S. PATENT DOCUMENTS 5,361,258  11/1994  Arnold et al. ......................... 370/69.1

FOREIGN PATENT DOCUMENTS 360 589   3/1990   European Pat. Off. .

OTHER PUBLICATIONS

"Novel Radio Access Principles Useful for Third Generation Mobile Radio Systems", Dag Åkerberg, *The Third IEEE International Symposium on Personal, Indoor and Mobile Radio Communications*, Oct. 19–21, 1992, pp. 1–3, 8 & 10.
"Capacity Improvement by Adaptive Channel Allocation", Håkan Eriksson, *IEEE*, 1988, pp. 1355–1359.

*Primary Examiner*—William Cumming
*Assistant Examiner*—Linwood C. Scott, Jr.
*Attorney, Agent, or Firm*—Burns, Doane, Swecker & Mathis, L.L.P.

[57] ABSTRACT

There is provided a method and an arrangement for flexible coexistence of several radio communication systems on a common radio frequency band. The radio frequency band has a larger bandwidth than the communication frequency band of the several radio communication systems. Prior to the start of a radio communication, the radio frequency band is scanned by a radio transceiver unit of a system for the detection of the presence of interference. The transceiver units are arranged to establish communication over any idle part of the radio frequency band comprising or covering the communication frequency band, thereby avoiding the need for frequency or channel planning. The invention can be used in Personal Communication Systems (PCS) or Cordless Terminal Mobility (CTM) services and Radio in the Local Loop (RLL) applications.

19 Claims, 10 Drawing Sheets

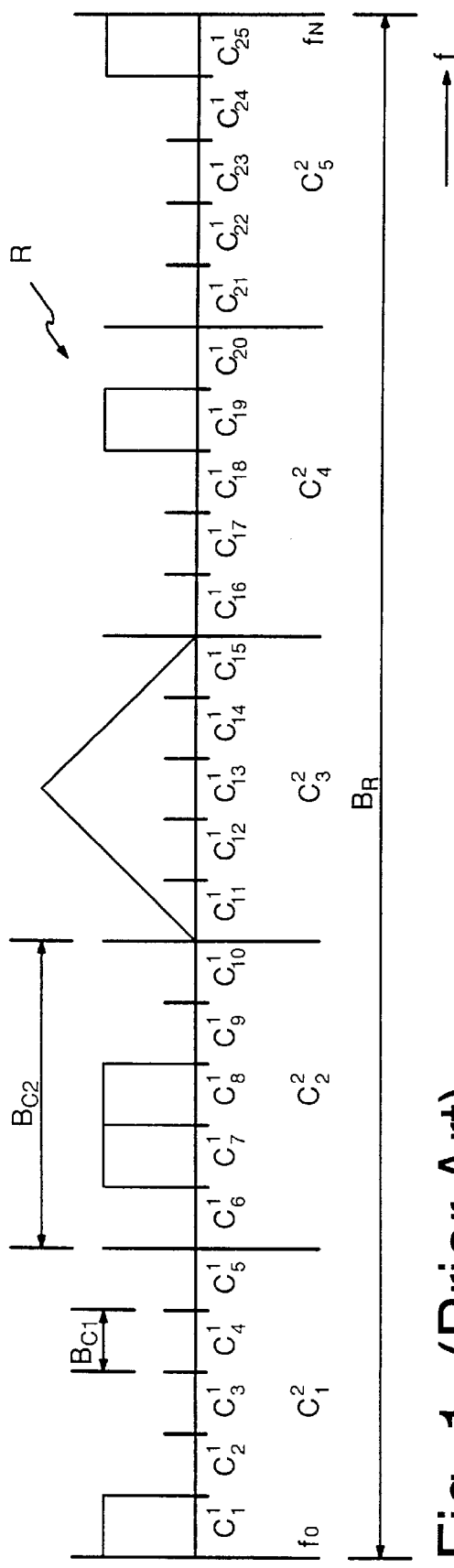
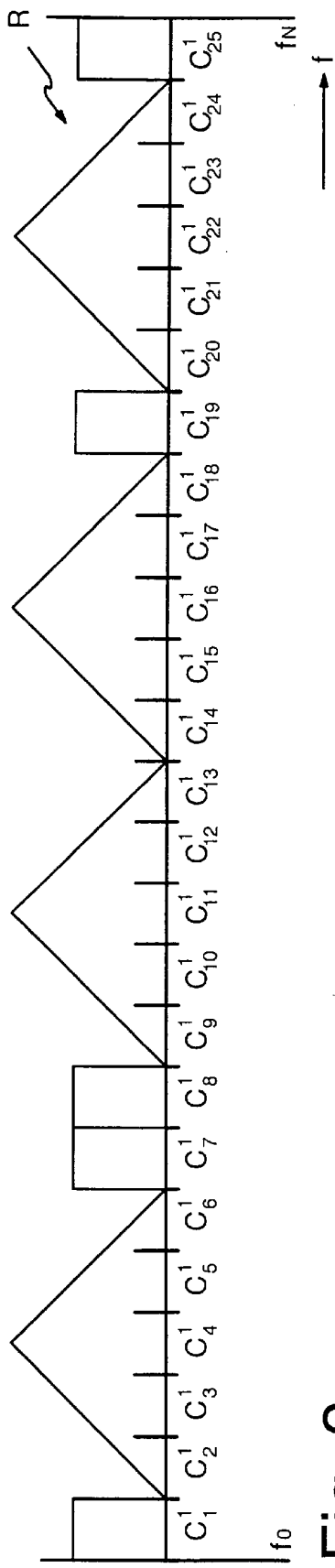
Fig. 1 (Prior Art)
Fig. 2

METHOD AND ARRANGEMENT FOR SPECTRUM SHARING IN A RADIO COMMUNICATION ENVIRONMENT

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention.

The present invention relates generally to telecommunication systems and, more specifically, to radio transmission systems for communication between two or more telecommunication units, at least one of which can be mobile.

2. Description of the Related Art Including Information Disclosed Under 37 CFR 1.97 and 1.98.

In recent years various techniques and concepts of private radio communication systems for mobile telephony and data transmission have been developed. In general two types of mobile communication systems can be distinguished.

The first is cellular communication, providing coverage over a relatively wide area, i.e. relatively large cells. Analogue cellular systems, such as designated AMPS, ETACS, NMT-450 and NMT-900 have been deployed throughout the world. Digital cellular systems are designated IS-54B in North America and the pan-European GSM system.

The second is cordless communication, ranging from simple residential cordless telephones to business cordless systems capable of serving hundreds or even thousands of cordless communication units across (large) offices, production halls etc. Analogue cordless telephones are designated CT0, CT1 and CT1+. Amongst the digital cordless systems, designated CT2, CT2-CAI, CT3 and DECT (Digital Enhanced Cordless Telecommunications), both CT3 and DECT use TDMA (Time Division Multiple Access) as their transmission technique, whereas CT2 operates under FDMA (Frequency Division Multiple Access). Besides these access techniques, in particular in North America, spread spectrum access is used for cordless communication. CDMA (Code Division Multiple Access) is another digital access technique which can be used for cordless communication.

At present, for each of the above technologies, specific radio frequency bands have been allocated. These radio frequency bands are sub-divided into various fixed radio channels. In CT3 and DECT systems, for example, is each radio channel further sub-divided in time into a number of communication channels. The radio channels of the various cordless technologies have a different frequency bandwidth, mainly due to a different number of communication channels in one radio channel and the modulation technique used. The bandwidth of each radio channel equals at least the total communication bandwidth, i.e. the number of communication channels in a particular radio channel times the frequency bandwidth of a single communication channel.

Some of the cordless technologies can also be used to provide a type of Personal Communication Services (PCS) or also called Cordless Terminal Mobility (CTM). This is basically a mobile telephone like service that covers a whole town or city. Customers of this service are able to carry their mobile communication units (telephone handsets) with them and can make calls in the coverage area of the service.

As deregulation gathers pace in telecommunication multiple operators will enter the market, using different radio technologies to provide some kind of PCS service in a given area. In such a case, one of the problems which has to be solved relates to the mutual isolation between the various communication systems and/or technologies used by the different operators, in order to avoid disturbances.

Mutual isolation could be provided by assigning special frequency bands or radio channels to specific operators, prohibiting the use thereof by others, for example. However, this is a very inefficient manner of using the available scarce radio frequency bandwidth. This, because it is difficult to estimate beforehand the required bandwidth for each operator. Further, it is not likely that the several operators will use their available transmission capacity to the same extents such that a lot of bandwidth is not efficiently used. It is even likely that the different operators will only set up a service in one or a few geographical areas, which involves a complex planning of bandwidth and radio channel allocation. To allow for new technologies and an increase of the service, an amount of frequency bandwidth has to hold in reserve, with the risk that it will not be used after all.

Instead of dedicated frequency bands or radio channels for each of the operators, another option would be the allocation of special PCS frequency bands or radio channels for each of the different cordless technologies, for example. However, in case several operators would like to cover a certain area with the same technology, such as DECT, it is necessary to operate the various systems in a synchronised manner.

Accordingly, for providing a PCS service, or in general any other (public) mobile radio telecommunication service, it would be very attractive to allow for multiple independent operated radio communication systems of the same or different technology to coexist in one or a few common radio frequency bands.

To provide for such a service, in which the various communication systems are allowed to operate essentially over a common radio frequency band, amongst others, access rules at the start of the transmissions have to be defined. Such that new transmissions, which would cause harmful disturbances to transmissions in progress, are prohibited to access part or parts of the radio frequency band temporarily occupied.

SUMMARY OF THE INVENTION

In view of the foregoing background, it is therefore an object of the invention to provide a method and an arrangement for radio communication, addressing the problems of coexistence of various communication systems or different technologies in a common radio frequency band.

It is in particular an object of the present invention to provide an optimised allocation of the temporarily available radio frequency bandwidth by defining suitable access rules.

These and other objects, advantages and features of the present invention are provided by a method for radio communication in a predetermined radio frequency band between a first transceiver unit and a second transceiver unit. The units are arranged to transmit and receive over a communication frequency band modulated at a carrier frequency, whereas the frequency bandwidth of the radio frequency band is larger than the communication frequency band.

The method comprises the steps of: scanning the radio frequency band by the first and/or second unit for the detection of the presence of interference prior to the start of the radio communication, and establishing communication between the first and second unit over any part of the radio frequency band comprising or covering the communication frequency band, dependent upon whether the presence of interference detected at such part is below a level suitable for communication.

Different from prior art transmission schemes, wherein the radio frequency band is sub-divided into a number of fixed radio channels over which transmission can be effected, such as disclosed by U.S. Pat. Nos. 5,361,258 and 4,914,651, in the present invention communication can be established over any part of the radio frequency band covering the communication frequency band of the particular radio system or technology. The actual occupation of a part of the radio frequency band depends on the fact whether this part, from an interference point of view, is available for transmission, i.e. essentially idle.

In prior art transmission schemes, for optimal subdivision of the radio frequency band into a number of fixed radio channels dependent on the different communication bandwidth of the various technologies, complete and/or partial overlap of radio channels allocated for the various technologies is unavoidable. This is in particular the case for relatively small radio frequency bands in which, for an efficient use of the scarce bandwidth, as much as possible radio channels have to be allocated. Radio channels corresponding to a first technology are not available in case these radio channels are partly or completely occupied by a transmission of a second technology. That is to say, in cases wherein just a relatively small fraction of a radio channel corresponding to a first technology is occupied by a transmission of a second technology, the radio channel as a whole can not be used for transmission by the first technology. It will be understood that in such case, viewed from the first technology, part of the radio frequency band is not efficiently used.

However, with the method according to the present invention, transmission can be established over any available part of the radio frequency band having the size of the required communication bandwidth. Such part of the radio frequency band can be occupied directly adjacent to part of the radio frequency band occupied by another system of the same or a different technology, without wasting any bandwidth due to a sub-division in fixed radio channels, as discussed above. It will be understood that the occupation of the relevant part or parts of the radio frequency will be terminated, in each case, with the end of the communication.

With the method of the invention not only the momentary available bandwidth can be more optimally used in cases wherein various systems of different technologies having different transmission bandwidth coexist in a common frequency band, but also in cases wherein systems having the same type of radio technology, e.g. DECT, operate in a mutually unsynchronised manner over a common frequency band.

BRIEF SUMMARY OF THE INVENTION

Accordingly, the method of the present invention provides for a flexible coexistence of different radio communication systems or technologies on a common radio frequency band, and avoids the need for spectrum allocation, frequency planning or channel planning.

To improve the quality of transmissions in progress as much as possible and also to improve the traffic handling capacity, a further embodiment of the method according to the invention comprises the steps of: scanning the radio frequency band by the first and/or second unit for the detection of the presence of interference while communication between the first and second unit is in progress, and establishing the communication in progress over any other part of the radio frequency band comprising or covering the communication frequency band if the communication can be carried out over this other part of the radio frequency band with a substantially increased performance compared to the communication in progress.

A scan for improving the communication can be carried out completely automatically, at regular intervals for example, or based on errors in the communication. In case of digital communication, for example, one can think of bit errors, various synchronisation errors etc.

In a very sophisticated embodiment of the invention, the radio frequency band is continuously scanned to provide real time information on the status of the interference. By storing this information, at least one of the transceiver units is informed about the idle part or parts of the radio frequency band over which communication can be established.

However, it will be understood that there is always a risk that during the scan, initially free parts of the radio frequency band will be occupied by another transmission. This risk can be minimised, for example, by a suitable fast scanning rate. Note that the radio frequency band is also scanned when the transceiver units are in a standby mode.

In a technically simplified and preferred embodiment of the method according to the present invention, a plurality of carrier frequency positions is defined within the radio frequency band. The spacing between at least part of adjacent carrier frequency positions is smaller than the communication frequency band.

The radio frequency band is now discretely scanned at these carrier frequency positions and communication is established by positioning the carrier frequency of the communication frequency band at a carrier frequency position corresponding to an idle part of the radio frequency band comprising or covering the communication frequency band of the system.

Different from the prior art transmission schemes, wherein the number and positions of the carrier frequency positions are determined by a sub-division of the radio frequency band into a number of fixed radio channels dependent on the communication frequency bands of the systems used, in this embodiment of the invention the number of allocatable carrier frequency positions is made substantially greater than the number of communication frequency bands which fit into the radio frequency band.

By defining a fine grid of carrier positions, i.e. wherein the spacing between adjacent carrier frequency positions is less or substantially equal to the smallest communication frequency band of a radio technology to be used, a great flexibility in choosing the best or optimum carrier position can be achieved. This, essentially equal to the embodiment of the invention wherein the radio frequency band is scanned and allocated in a non-discretely manner.

The presence of interference in a radio frequency band can be established, amongst others, by amplitude or radio frequency (RF) energy level measurements. The level of interference can be determined at discrete positions in the radio frequency band, for example. In the preferred embodiment of the invention, the signal strength (amplitude) or RF energy measurements are carried out at the defined carrier frequency positions. The actual implementation and processing of the interference measurement may, however, depend on particular access rules for starting transmissions in a specific radio frequency band.

In order to shorten the access procedure as much as possible, in a further embodiment of the invention a plurality of interference levels is defined ranging upwards from a lower first level of interference to an increased second level of interference respectively, and wherein communication is directly established over part of the radio frequency band if the interference in this part is below the first level.

By directly establishing communication over part of the radio frequency band which is acceptable, but not necessarily the best, for starting a radio communication, access times can be shortened compared to a scanning of the radio frequency band for the least interfered part. However, in cases wherein the interference level within the entire radio frequency band is not below the above first level, the quickest access times can be achieved, according to a yet further embodiment of the invention, by establishing communication over part of the radio frequency band last scanned. Of course only if the interference in this part of the radio frequency band is above the first level and below the second level of interference.

In a still further embodiment of the invention, the first unit is a fixed base unit and the second unit is a mobile remote unit of an arrangement for cordless telecommunication, in particular a cordless telephone arrangement comprising a plurality of base units and a plurality of remote units. In order to establish communication between a base unit and a remote unit, operating information is exchanged by the units, whereas the base and/or remote unit interrogate the radio frequency band for the presence of this operating information.

The operating information may contain data regarding the identity of the transmitting unit, the type and destiny of the communication and any other particularities regarding the transmission, according to a specific system implementation or transmission standard used, for example. In the preferred embodiment of the invention, the radio frequency band can be interrogated at the defined carrier frequency positions.

In case the base units and the remote units are arranged for establishing communication over a plurality of communication channels in a communication frequency band, and the communication channels are time-slots in a repeated time frame, in accordance with the present invention, the steps of scanning for interference and/or interrogation for operating information are also carried out at different points in time corresponding to the time-slots of the repeated time frame. In a corresponding manner as described above, for establishing communication over an available part of the radio frequency band, various levels of interference can be defined for allocating an available communication channel (time-slot).

The invention relates further to an arrangement for radio communication in a predetermined radio frequency band, comprising a first transceiver unit and a second transceiver unit. These units are arranged to transmit and receive over a communication frequency band modulated at a carrier frequency. The arrangement comprises scanning means in one or both of the units, which scanning means are arranged for the detection of the presence of interference in the radio frequency band prior to establishing communication between the units. Control means are provided for establishing communication between the first and second unit dependent whether the presence of interference detected is below a level suitable for communication. In accordance with the invention, these control means and the transceiver units are arranged to establish communication between the first and second transceiver unit over any part of the radio frequency band comprising or covering the communication frequency band.

Different from prior art arrangements for cordless radio communication, wherein the control means are limited to establish communication over predetermined fixed radio channels, with the control means according to the present invention communication can be established over any part of the radio frequency band having the size of the communication frequency band of the particular technology. However, provided that this part is available for transmission according to the amount of interference present.

In further embodiments of the arrangement according to the invention, the scanning means are arranged for scanning the radio frequency band for the detection of the presence of interference while communication between the first and second unit is in progress, or continuously, for providing information on the actual status of the interference in the radio frequency band.

In the preferred embodiment of the arrangement according to the invention, the scanning means are arranged for scanning the radio frequency band at a plurality of predetermined carrier frequency positions. The spacing between at least part of adjacent carrier frequency positions is smaller than the communication frequency band. The control means are arranged to establish communication at any frequency position corresponding to part of the radio frequency band comprising the communication frequency band, by positioning the carrier at this frequency position.

With reference to what has been described above, the scanning means can be arranged for processing the measured interference with regard to several predetermined levels of interference. By having the scanning means arranged to perform signal strength and/or RF energy measurements in the radio frequency band, a relatively easy to establish and reliable detection of the presence of interfere is provided. The actual implementation and processing of the interference measurement may, however, depend on particular access rules for starting transmissions in a specific radio frequency band.

In a further embodiment of the invention, wherein the first unit is a fixed base unit and the second unit is a remote unit of an arrangement for cordless telecommunication, in particular a cordless telephone arrangement comprising a plurality of base units and a plurality of fixed and mobile remote units, the control means of each base unit and each remote unit are arranged for establishing communication by exchanging operating information. The scanning means of the base units and/or remote units are arranged to interrogate the radio frequency band for the presence of such operating information. In the preferred embodiment of the invention, the radio frequency band is interrogated at the predetermined carrier frequency positions.

The invention also relates to a base unit and fixed and mobile remote units for use in the arrangement according to the invention.

The above-mentioned and other features and advantageous of the invention are illustrated in the following description with reference to the enclosed drawings.

BRIEF DESCRIPTION OF THE SEVERAL VIEWS OF THE DRAWINGS

FIGS. 1–6 show, in a schematic and illustrative manner, examples of the allocation of a radio frequency band according to the prior art and the invention.

DETAILED DESCRIPTION OF THE INVENTION

Figure 3:
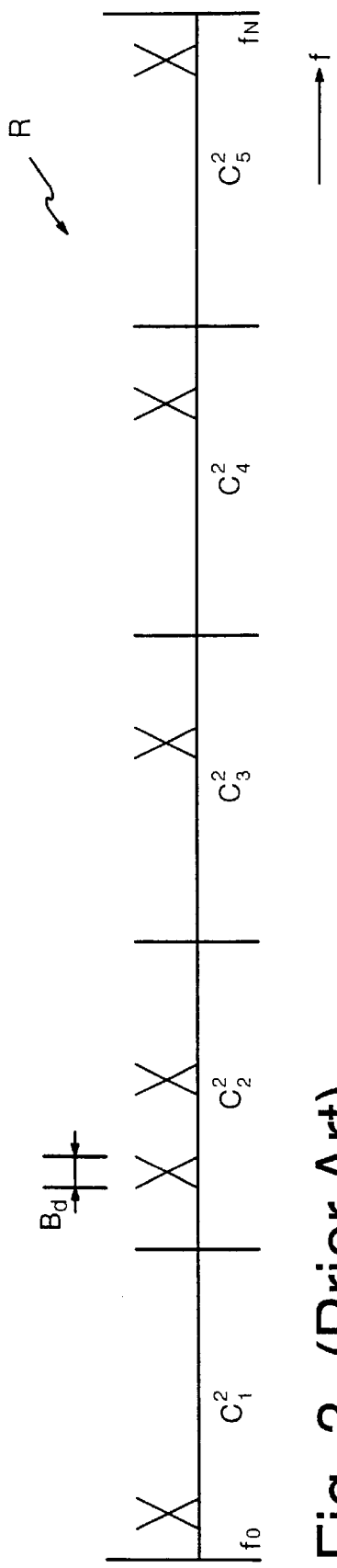

The invention will now be described and illustrated with reference to exemplary embodiments to which the invention is, however, not limited. To illustrate the inventive concept of the present invention, it is assumed that two radio communication systems of different technologies having different communication frequency bandwidth $B_{C1}$ and $B_{C2}$ have to be independently operated over a single common radio frequency band R. This radio frequency band ranges from a lower frequency $f_0$ up to a higher frequency $f_N$ and has a frequency bandwidth $B_R$. The information to be exchanged by the first and second system is in a known manner modulated at a carrier. The frequency $f_C$ of such carrier lies essentially in the radio frequency band R. For clarification purposes only, the following values are assumed: $B_{C1}=1$ MHZ; $B_{C2}=5$ MHZ; $B_R=25$ MHz.

FIG. 1 shows a prior art transmission scheme, wherein the radio frequency band R is sub-divided into a number of fixed radio channels. In the present example, twenty-five radio channels for the first system, indicated with short vertical lines and numbered $C^1_1, C^1_2, \ldots C^1_{25}$, and five radio channels for the second system, indicated with longer vertical lines and numbered $C^2_1, C^2_2, \ldots C^2_5$.

In the situation shown in FIG. 1, it is assumed that the first system occupies the radio channels $C^1_1, C^1_7, C^1_8, C^1_{19}$ and $C^1_{25}$. The occupied channels are indicated with rectangular boxes. From the figure it is immediately clear that the second system can only occupy radio channel $C^2_3$, indicated by a triangle, because all of the other radio channels available for the second system are disturbed by a transmission of the first system.

The concept of the invention is illustrated in FIG. 2. To clarify the invention, it is assumed that for the first system still fixed radio channels $C^1_1, C^1_2, \ldots C^1_{25}$ are allocated, however not for the second system. That is to say, according to the present invention, the second system is allowed to occupy any part of the radio frequency band R having the size of the communication bandwidth $B_{C2}$ of the second system.

Following the method of the invention, the second system now will scan the radio frequency band R to find a part having the width of the communication frequency band $B_{C2}$ and, in this particular embodiment, is not disturbed by a transmission of the first system. Assuming the same channel occupation as illustrated in FIG. 1, with the method of the invention not less than four separate parts of the radio frequency band R can be occupied by the second system for establishing communication without disturbing the first system or otherwise, as indicated by triangles in FIG. 2.

Compared to the fixed channel allocation of prior art transmission schemes as illustrated in FIG. 1, it will be evident that the method according to the invention provides a more efficient use of the available bandwidth of the radio frequency band R. It will be clear that the first system, like the second system, can be operated according to the invention, i.e. without a sub-division of the radio frequency into fixed radio channels.

The method of the invention is also advantageously in those cases, wherein only one system is operated over a predetermined frequency band, which suffers from some kind of interferences. This is illustrated in FIGS. 3 and 4.

Corresponding to the example described above, it is assumed that transmissions having a communication bandwidth $B_{C2}$ have to be exchanged over the radio frequency band R. Further, it is assumed that the radio frequency band R suffers from external interferences having a frequency bandwidth $B_d$. These interferences are indicated with crosses. For clarification purposes only, it is assumed that $B_d=0.5$ MHz for each of the interferences.

Figure 4:
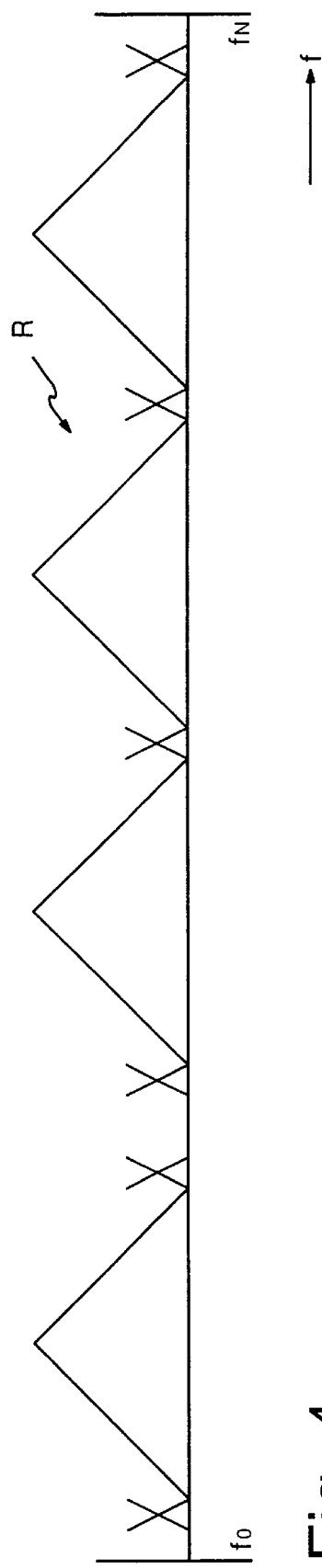

In a prior art fixed channel transmission scheme as illustrated in FIG. 3, the interferences prohibit the use of a particular radio channel, i.e. channel $C^2_1, C^2_2, C^2_3, C^2_4$ and $C^2_5$. However, with the method of the invention, as illustrated in FIG. 4, instead of no transmission now communication can be established over not less than four channels without suffering from any disturbance by the indicated interferences.

It will be understood that the method of the invention can be used with the same advantage in cases wherein multiple systems of the same technology, i.e. having equal communication bandwidth, are independently operated over a common frequency band suffering from interferences.

Figure 5:
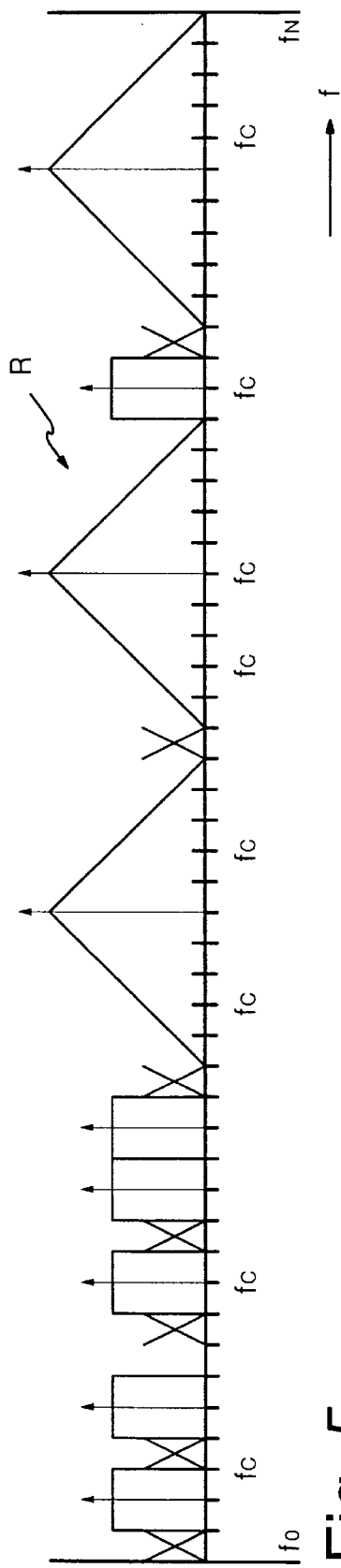

The radio frequency band can be scanned in a discrete manner. FIG. 5 shows the radio frequency band R sub-dived into a plurality of so-called carrier frequency positions $f_C$, indicated with short vertical lines. These carrier frequency positions are more closely spaced than the width of the smallest communication frequency band of the systems which have to be operated over the radio frequency band R.

With reference to the previous example, for clarification purposes, it is assumed that the carrier positions $f_C$ have a mutual spacing of 0.5 MHz, while first and second systems having a communication bandwidth $B_{C1}$ and $B_{C2}$ are operated over the radio frequency band R. For simplicity, double-sided frequency spectra are assumed, i.e. the message information is contained in so-called frequency side bands ranging on both sides of the carrier frequency. According to the method of the invention, the radio frequency band R is scanned every 0.5 MHz, i.e. determined by the grid of the carrier frequency positions $f_C$.

FIG. 5 illustrates a very efficient use of the available frequency bandwidth whenever additional disturbances or interferences, indicated with crosses, are present in the radio frequency band R. That is to say, six radio channels having a bandwidth $B_{C1}$ for the first system and three radio channels having a bandwidth $B_{C2}$ for the second system have been allocated.

Figure 6:
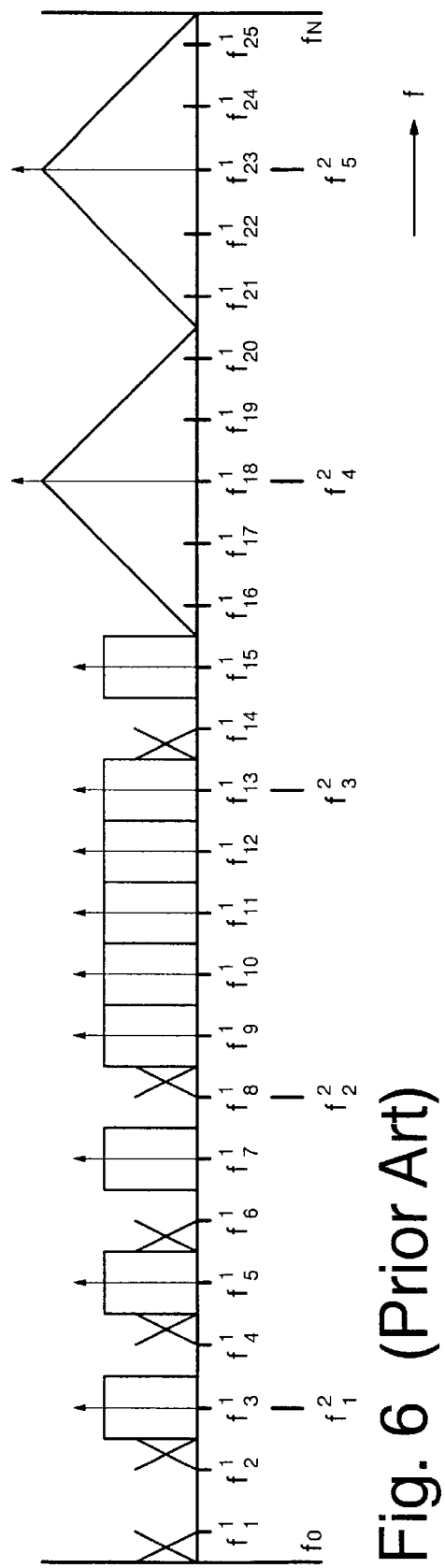

As illustrated in FIG. 6, compared to a prior art transmission scheme having fixed carrier frequency positions for the radio channels of the first system and fixed carrier frequency positions for the radio channels of the second system, i.e. indicated by $f^1_1, f^1_2, \ldots f^1_{25}$ and $f^2_1, f^2_2, \ldots f^2_5$, respectively, in the presence of the same interferences shown in FIG. 5, with the method of the invention 0.5 MHz of the available bandwidth of 21.5 MHz is left unused, i.e. ±2%, whereas with the prior art allocation scheme 3 MHz of the available bandwidth can not be used, i.e. ±14%.

Figure 7:
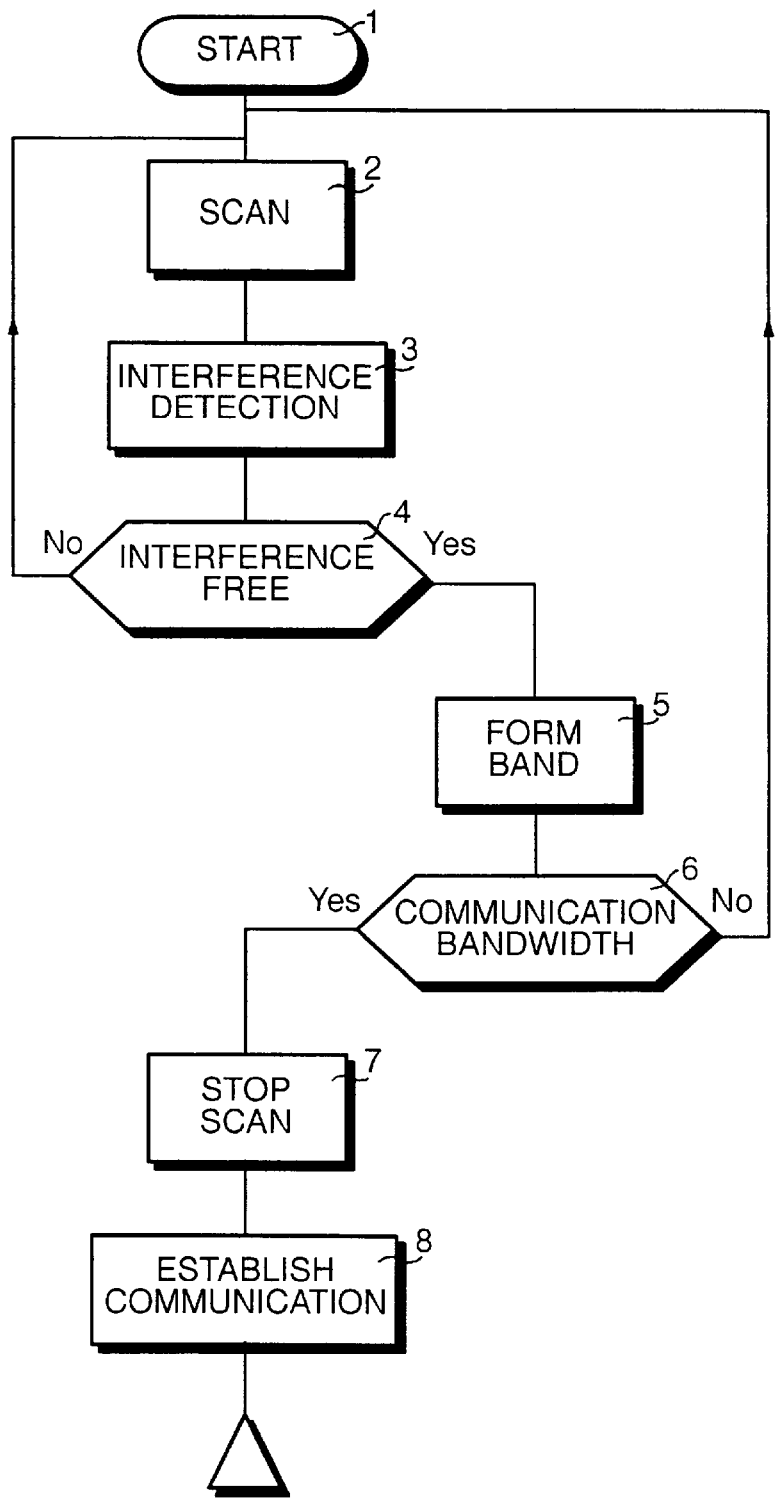
FIGS. 7–9 show simplified flow chart diagrams of embodiments of the method according to the invention.

FIG. 7 shows a very simplified flow chart diagram of the method according to the invention. It is assumed that a grid of fixed carrier frequency positions is defined.

Starting with step 1 "START", in step 2 "SCAN" the radio frequency band will be discretely scanned at the carrier frequency positions. At each carrier frequency position, a detection is carried out for the presence of interference, indicated by step 3 "INTERFERENCE DETECTION". With decision step 4 "INTERFERENCE FREE", it is tested whether the particular carrier frequency position is essentially free of interference; i.e. such that a reliable communication could be established over this part of the radio frequency band. If negative "No", scanning has to be proceeded at another carrier frequency position. In the affirmative "Yes", the result of the scan at the particular carrier frequency position will be processed in step 5 "FORM BAND".

In general, in step 5 a concatenation of carrier frequency positions is formed, having the width of the communication frequency bandwidth of the system and which is essentially free of interference.

With decision step 6 "COMMUNICATION BANDWIDTH", it is tested whether the string of carrier frequency positions covers a bandwidth at least equal to the communication frequency band of the system. In the affirmative "Yes", the scan can be stopped, step 7 "STOP SCAN", and communication can be established over part of the radio frequency band determined by the string of carrier frequency position, step 8 "ESTABLISH COMMUNICATION". If negative "No", the scan has to be repeated until an interference free part of the radio frequency band has been detected. The number of scans of the complete radio frequency band can be limited, of course.

It will be understood that a very fine grid of carrier frequency positions allows for a very efficient occupation of the radio frequency band. However, a fine grid can have the disadvantage of unacceptable long access times because of the scanning time involved. To avoid unduly long access times, in particular in cases wherein the chance of finding part of the frequency band essentially free from disturbances is very small, various levels or thresholds of interference can be defined. These levels may range from no interference or a relatively low level of interference to an increased level of interference at which no transmission at all is possible. These levels of interference can be different for the different systems, dependent on their specific transmission properties.

Figure 8:
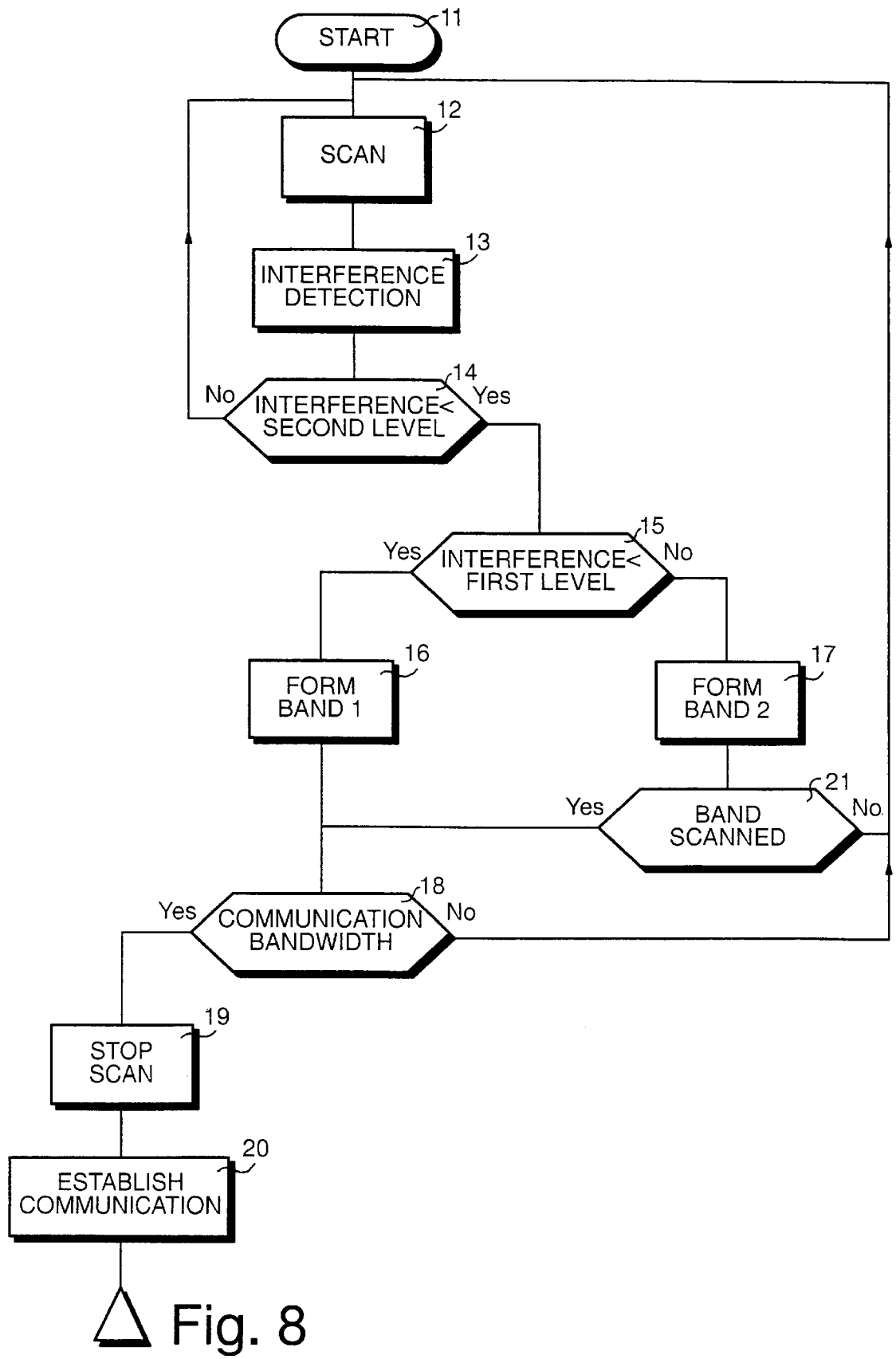

FIG. 8 shows a very simplified flow chart diagram of a further embodiment of the method according to the invention, wherein a first and a second level of interference are defined. The first level corresponds to a moderate level of interference, at which communication is possible, however with an increased risk of faults etc. The second level corresponds to a higher degree of interference above which no communication is readily possible. Further, it is again assumed that a grid of fixed carrier frequency positions is defined.

Comparable to the steps illustrated in FIG. 7, after step 11 "START", in step 12 "SCAN" the radio frequency band will be discretely scanned at the carrier frequency positions while at each carrier frequency position interference measurement is carried out, step 13 "INTERFERENCE DETECTION". In case the measured level of interference is above the second level, which is to be determined in decision step 14 "INTERFERENCE<SECOND LEVEL", no communication is possible at this carrier frequency position, and the scan has to be continued at another frequency position (negative decision result "No").

However, in case the measured level of interference is below the second level, positive result "Yes", it has to be decided whether the measured interference is also above the first level of interference. This test is performed in decision step 15 "INTERFERENCE<FIRST LEVEL". Dependent on this decision, the corresponding carrier frequency position will be processed in step 16 "FORM BAND 1", or in step 17 "FORM BAND 2". Like step 5 above, the steps 16 and 17 are arranged to establish a concatenation of carrier frequency positions covering the communication frequency bandwidth of the system.

In case the measured interference in part of the radio frequency band comprising the communication bandwidth of the particular system is below the first level, this part can be directly allocated for communication. The decision is taken in step 18 "COMMUNICATION BANDWIDTH". In the affirmative "Yes", the scan can be stopped, step 19 "STOP SCAN", and communication can be established over this part, step 20 "ESTABLISH COMMUNICATION". If negative "No" the scan has to be continued at the next frequency position, for example.

However, when no suitable part of the radio frequency band has an interference below the first level, i.e. when the complete radio frequency band has been scanned, it has to be tested whether part of the radio frequency band has an interference between both levels. Scanning of the entire radio frequency band is tested in decision step 21 "BAND SCANNED". If not, i.e. result "No", the scan has to be continued. However, in the affirmative, decision result "Yes", it has to be tested whether the string of carrier frequency positions formed in step 17 covers the communication bandwidth of the system, i.e. step 18 and the scan can be stopped and communication can be established, i.e. steps 19 and 20, respectively.

Thus, in this method of the invention, part of the radio frequency band is directly allocated in case the measured interference is below a first moderate level of interference, whereas the complete radio frequency band is scanned in cases of stronger interferences. Step 20 can be arranged, such that part of the radio frequency band last scanned is allocated for establishing communication.

Figure 9:
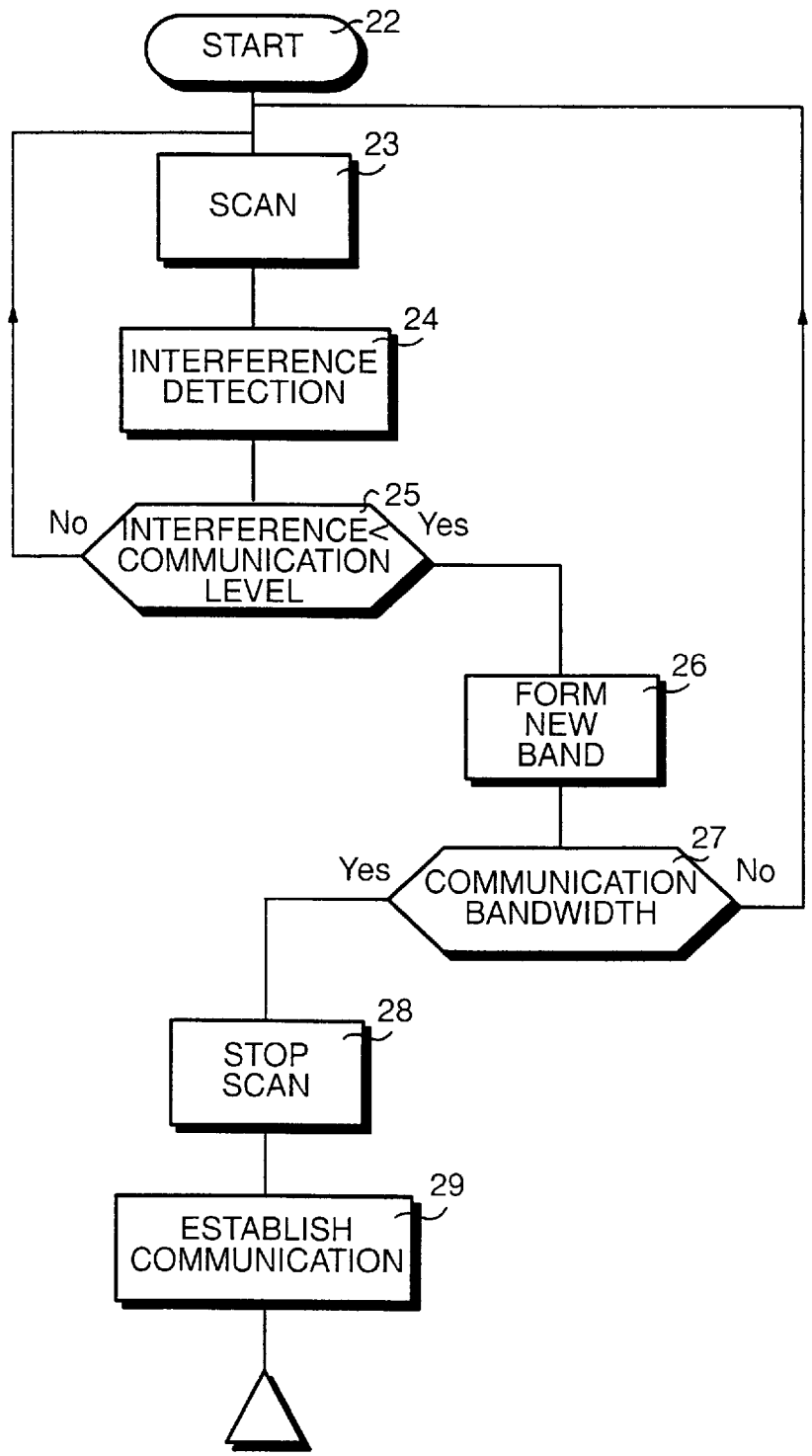

Once communication has been established, a further scan can be performed to search for a more optimum part of the radio frequency band, i.e. less interfered. This is illustrated in the simplified flow chart of FIG. 9.

After start of the scan, step 22 "START" and step 23 "SCAN", the interference present at each of the frequency positions, step 24 "INTERFERENCE DETECTION", can be compared with the level of interference at which communication has been established, for example. This comparison is made in decision step 25 "INTERFERENCE<COMMUNICATION LEVEL". If the result is negative "No", no performance increase in the communication can be reached by allocating this part of the radio frequency band. However, in the affirmative "Yes", improved communication might be possible, such that this carrier frequency position is further processed in step 26 "FORM NEW BAND".

Like steps 5, 6, 7 and 8 described above with reference to FIG. 7, in steps 27, 28 and 29 it is tested whether a different part of the radio frequency band can be allocated for establishing an improved communication compared to the communication in progress. It will be understood that this method can be enhanced with a processing of interference at different levels, as described above with reference to FIG. 8.

The detection of interference can be performed by measuring signal strength and/or radio frequency (RF) energy at various positions in the radio frequency band. This type of measurements is well known in the art. No further explanation is needed here.

The above flow chart diagrams are subject to many alterations and modifications. Some steps or blocks may be interchanged, for example, however without departing from the inventive concept of the present invention. Further, the radio frequency band can be scanned in many different manners, i.e. downstream from a higher to a lower frequency, by hopping between preferred regions or by avoiding forbidden regions in case the radio frequency band consists of several sub-bands, etc.

Figure 10:
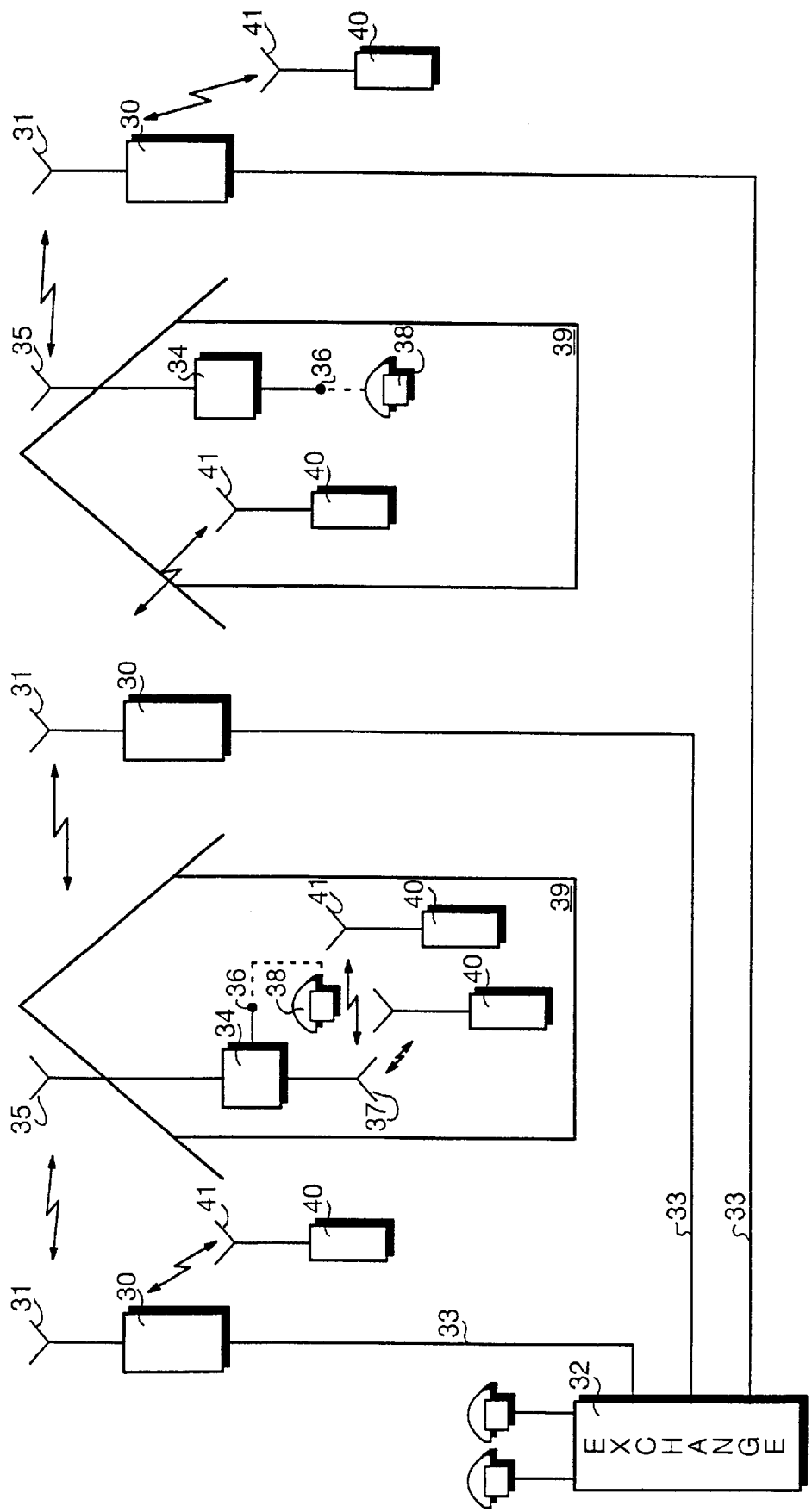
FIG. 10 shows, in a very schematic manner, an example of an architecture of a Personal Communication Service (PCS) for telephony, wherein the method according to the invention is used.

The invention will now be further explained with reference to an exemplary embodiment of an arrangement for radio communication, comprising a plurality of fixed base units and a plurality of remote units, as illustrated in FIG. 10.

FIG. 10 shows an example of a radio telephone system which, amongst others, provides a form of a personal communication system (PCS). The system comprises a plurality of base units 30, each comprising a radio transceiver unit, the transceiver output of which is connected to a receive/transmit antenna 31. The base units 30 are further coupled to a telephone exchange or switch 32, for connection to a private and/or a public telephone network. Although the connections to the exchange 32 are shown in the form of a cable 33, i.e. a copper wire or an optical fibre, this could also be a microwave link, for example.

The system further comprises a number of fixed remote units 34, each comprising a radio transceiver unit connected to a transmit/receive antenna 35, for establishing radio communication with a base unit 30. The remote units 34 comprise either one or both a telephone terminal 36, for connecting an ordinary wire-type telephone 38 and a further receive/transmit antenna 37. As illustrated, the remote units 34 are installed in a building 39, such as a house or the like. The antenna 35 may be an indoor or outdoor antenna, whereas the further antenna 37 is generally an indoor antenna.

Besides fixedly installed remote units 34, the system comprises also several mobile remote units 40, in the form of telephone handsets. These mobile remote units 40 each comprise a transceiver unit, one end of which is connected to a receive/transmit antenna 41 and another end of which is connected to a microphone/loudspeaker arrangement for voice communication. As illustrated, these mobile remote units 40 can be used inside the building 39, to establish a radio connection with the fixed remote units 34, via the indoor antenna 37 and the mobile antenna 41, or outdoor for establishing direct radio communication with a base unit 30, via their respective antennas 31 and 41.

In case the exchange 32 is a public telephone exchange, the present system can be used as a so-called Radio in the Local Loop (RLL) system, for the replacement by a radio link of the local wire loop from the local public telephone exchange to the individual telephone subscribers.

The system can, in principle, be operated with various of the cordless technologies mentioned in the introduction. It is also possible to have several different technologies operating in the same geographical area. In such case, the method according to the invention may be advantageously used for operating these systems in the same radio frequency band, as described above.

Figure 11:
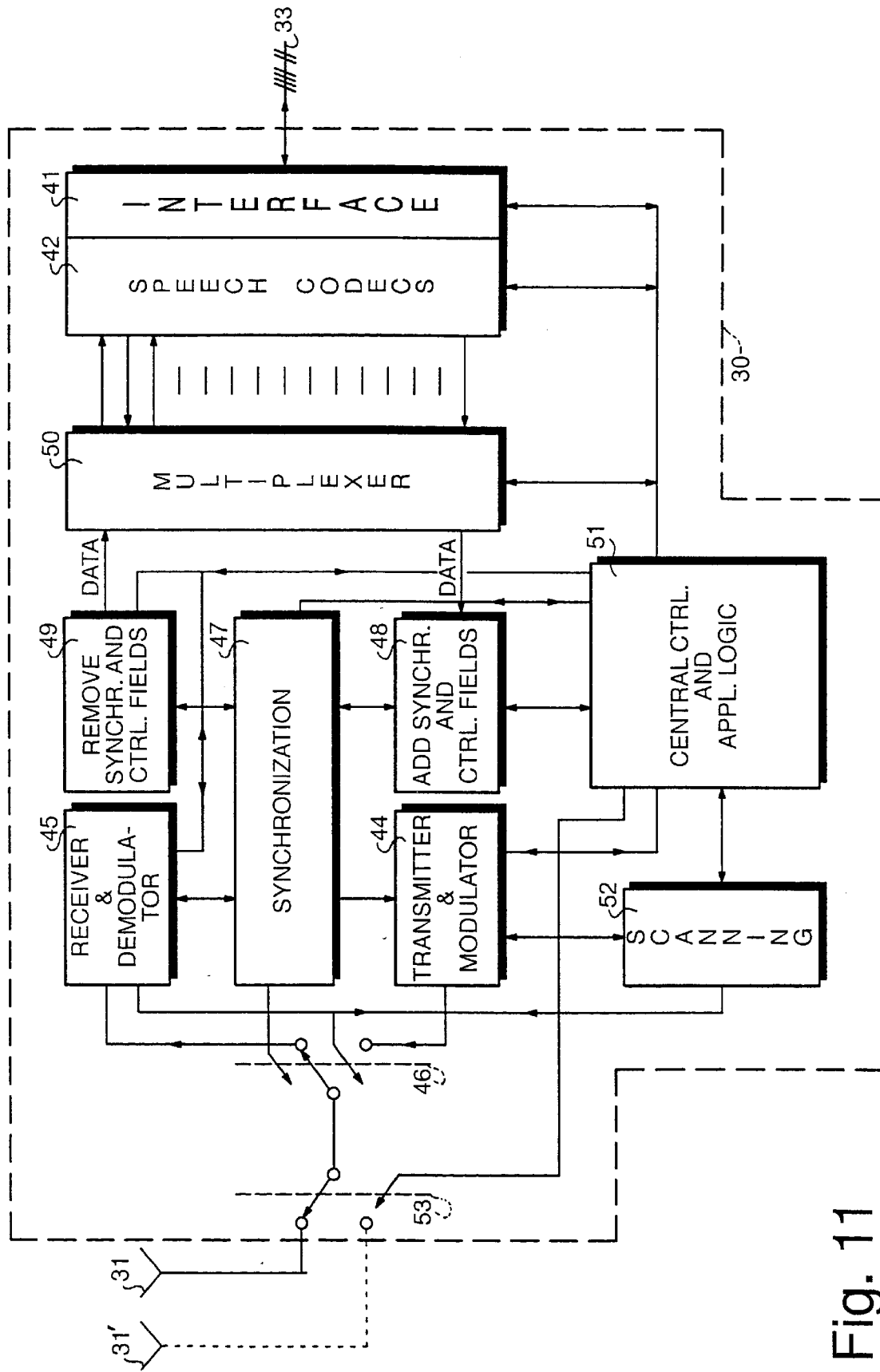
FIG. 11 shows a block diagram of a base unit, operating according to the method of the invention, for use in the PCS network of FIG. 10.

FIG. 11 shows a simplified block diagram of a base unit 30, equipped for operating according to the method of the invention. The base unit 30 comprises a line interface 41 having a wired connection 33 to a telephone exchange (not shown). Over this connection 33 multiple telephone calls can be exchanged.

On the radio side, the base unit 30 comprises an air interface in the form of a transceiver unit comprising a transmitter/modulator unit 44 and a receiver/demodulator unit 45. Both units 44 and 45 are coupled to the antenna 31 via a Transmit/Receive (T/R) switch 46. The base unit 30 also comprises a synchronisation unit 47, which controls the transmission timing. In case of TDMA/TDD technology this synchronisation unit 47, amongst others, controls the frame and time slot synchronisation of the system. Timing reference is either internally generated or derived from a synchronisation signal received over the connection 33 from the exchange, for example.

Further, control and synchronisation units 48 and 49 are provided, connected to the transmitter 44 and the receiver 45, respectively, for processing the separate calls. Unit 48 adds control and synchronisation information to the individual calls which have to be transmitted, whereas unit 49 removes this information from the received calls before feeding to speech codecs 42. The codecs 42 transcode the received speech information of the calls in a suitable format. A multiplexer 50 is connected between the codecs 42 and the units 48 and 49. Note that the codecs 42 can be arranged outside the base unit 30, in an interworking unit between the or several base units 30 and the public or private telephone exchange, for example.

The base unit 30 further comprises a central control and application logic 51, connected as shown. This central control and application logic 51 detects all incoming calls and controls all outgoing calls, and merges the different connections and radio channels via the multiplexer 50. In case of a multi-carrier multi-time-slot technology, such as DECT, the central control and application logic 51 controls the various combinations of carrier frequencies and timeslots. As indicated by switches 53, if antenna diversity is implemented, the choice between the first antenna 31 and a second antenna 31' is also controlled by the central control and application logic 51.

For a proper choice of a communication channel, i.e. a time-slot in a TDMA technology, the central control and application logic 51 co-operates with scanning means 52, arranged for scanning predetermined communication channels and for the detection of interference in the radio frequency band. In case of an available idle communication channel, the scanning means 52 will allocate this channel, whereas under the control of the central control and application logic 51 communication will be established over this channel by exchanging proper operating information with a remote unit or remote units in question.

In addition to the selection of a proper communication channel, in accordance with the invention, the scanning means 52 are arranged to operate for scanning of the available radio frequency band in order to allocate a suitable idle part of the radio frequency band, which part comprises the communication frequency bandwidth of the system. The term idle refers in this context to a level of interference below a predetermined first level of interference, suitable for establishing communication.

Further, the transmitter and receiver units 44, 45 are arranged, in accordance with the invention, such that they can be tuned to the allocated part of the radio frequency band for establishing communication under the control of the central control and application logic 51. For this purpose, use can be made of Voltage Controlled Oscillators (VCO's) or frequency synthesizers in the transmitter and receiver units, which are known per se. With a multi-carrier technology such as DECT, for example, the scanning means 52 may be arranged for allocating several parts of the radio frequency band, for establishing communication over each of these parts.

As already described with reference to FIG. 8, the central control and application logic 51 may also be arranged to establish communication over any part of the radio frequency band having a level of interference below a predetermined second level of interference, which is higher than the above-mentioned first level. This in case the interference in the entire radio frequency band is above the first level. Implementation of this embodiment requires interference detection means suitable for identifying several levels of interference.

In order to improve the communication, to search for part of the radio frequency band having the least interference, for example, the scanning means 52 may be arranged for scanning the radio frequency band when radio communication with a remote unit is in progress. It is also possible to operate the scanning means continuously, in order to have real time status information of the interference in the entire radio frequency band. To this end, the scanning means 52 or the central control and application logic 51 have to be provided with suitable memory means.

For scanning the radio frequency band, the scanning means 52 may be provided with separate receiver means (not shown), coupled to the T/R switch 46. However, it is also conceivable to use the receiver means 45 for this purpose. For example, to make a continuously updated interference picture or map of the radio frequency band during idle times of the receiver.

Figure 12:
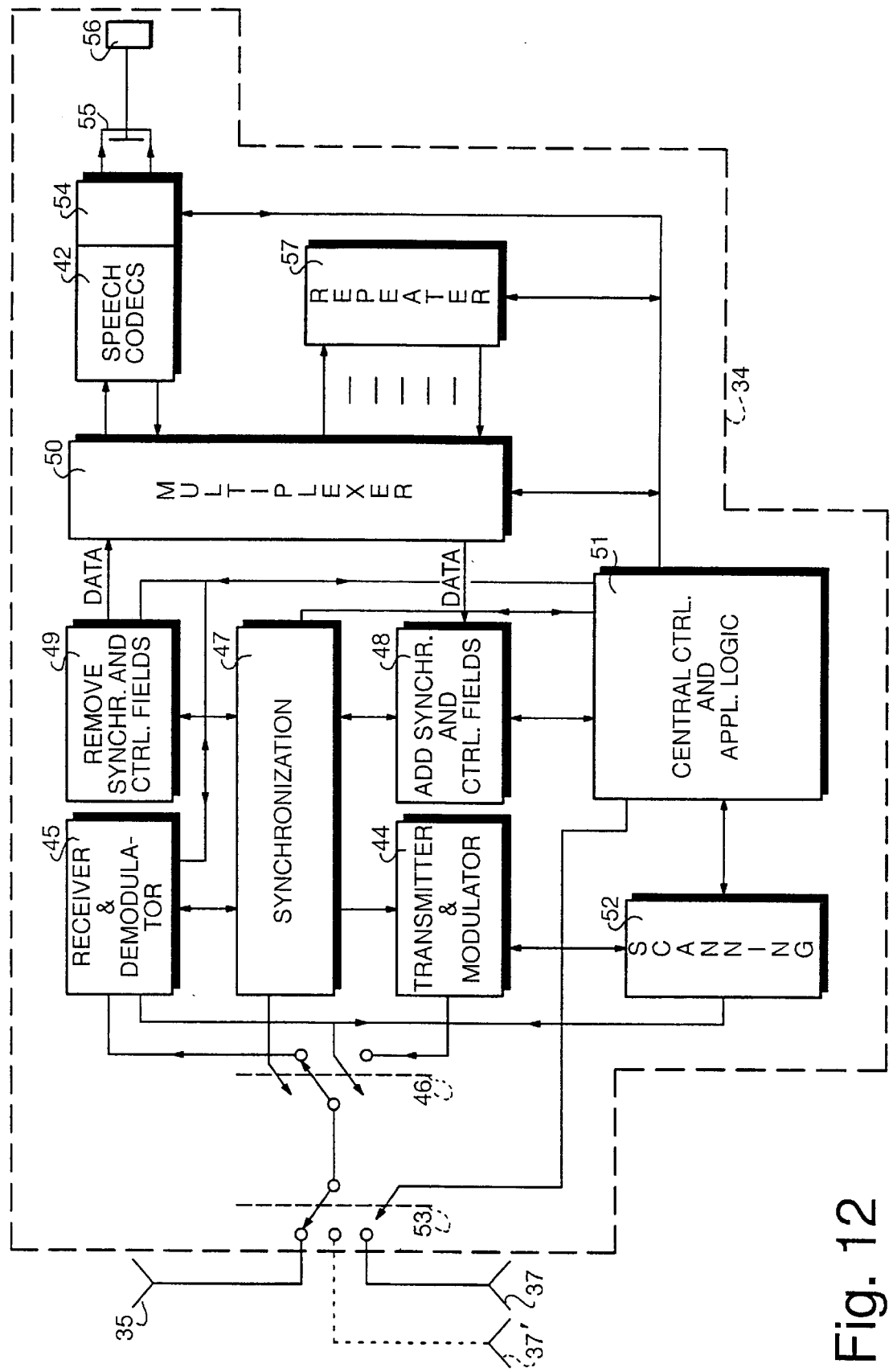
FIG. 12 shows a block diagram of a fixed remote unit, operating according to the method of the invention, for use in the PCS network of FIG. 10.

FIG. 12 shows a block diagram of a fixed remote unit 34, as illustrated in FIG. 10. This block diagram is almost equal to the block diagram of the base unit 30, shown in FIG. 11. Components which fulfill the same or an equivalent function as described with reference to FIG. 11 are designated by the same reference numerals. As a main difference, there is only one speech codec 42 which terminates in a wire hybrid circuit 55 and a telephone socket 56. Detection and generation of dial tone and ringing signals are carried out in the unit referenced 54. The central control and application logic 51 connects the external antenna 35 for communication with a base unit 30 and connects the indoor antenna 37 for communication with the mobile remote units 40. Further, repeater means 57 are provided, for the switching of calls received from the external antenna 35 to the indoor antenna 37 and vice versa.

In case of a TDMA/TDD technology, the repeater means 57 are shift registers for shifting information from one time slot to another, in the same or a succeeding time frame. It will be understood that communication can also be established internally, i.e. from the indoor antenna 37 to the socket 56 and vice versa. Antenna diversity is indicated with broken lines, i.e. indoor antenna 37'. In principle, the indoor antenna 37 or the interface to a socket 56 are optional.

Figure 13:
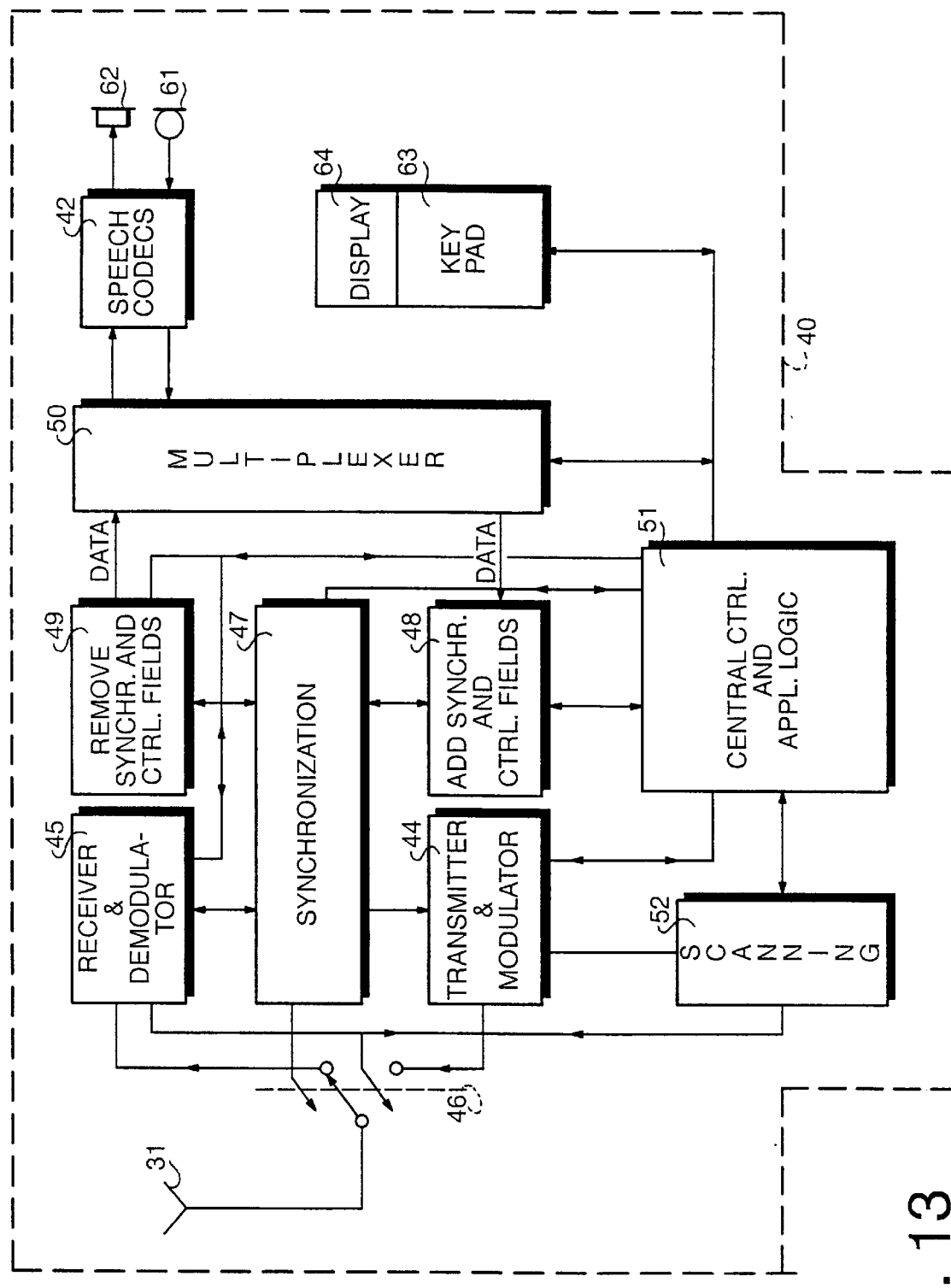
FIG. 13 shows a block diagram of a mobile remote unit designed as a cordless telephone, operating according to the method of the invention, for use in the PCS network of FIG. 10.

FIG. 13 shows a simplified block diagram of a mobile remote unit 40 designed as a cordless telephone, for use with a base unit 30 or a fixed remote unit 34, as shown in FIG. 10. Components which fulfill the same or an equivalent function as described with reference to FIGS. 11 and 12 are designated by the same reference numerals. The unit 40 has just one codec 42 connected to a microphone 61 and a loudspeaker 62. Further, a keypad 63 with a display 64 are provided, for control of the telephone by a user. Although not indicated, the mobile remote unit 40 may also have antenna diversity means.

Although both the base unit 30 and the remote units 34 and 40 are provided with scanning means 52, this is not absolutely necessary. In systems which make use of a separate signalling channel, for example, it suffices if only one of the units can scan the radio frequency band for establishing communication. This because data about the choice of a particular frequency band can be exchanged over the signalling channel.

However, a very flexible system without any frequency or channel planning is obtained when each of the units are arranged to allocate a suitable part of the frequency band and, preferably, in combination with the so called Dynamic Channel Allocation (DCA) or Continuous Dynamic Channel Selection (CDCS) technique, in which each unit can freely select any communication channel available in an allocated part of the radio frequency band. A more elaborated discussion on DCA and CDCS can be found in U.S. Pat. Nos. 4,628,152; 4,731,812 and a paper by D. Åkerberg, "Novel Radio Access Principles Useful for the Third Generation Mobile Radio Systems", The Third IEEE International Symposium on Personal, Indoor and Mobile Radio Communication, Boston Mass., Oct. 19–21, 1992; and a paper by H. Eriksson, "Capacity Improvement by Adaptive Channel Allocation", IEEE Global Telecommunications Conference & Exhibition, Hollywood, Fla., US, Nov. 28–Dec. 1, 1988.

I claim:

1. A method for radio communication in a predetermined radio frequency band between a first transceiver unit and a second transceiver unit, said units being arranged to transmit and receive over a communication frequency band modulated at a carrier frequency, said radio frequency band having a frequency bandwidth which is larger than said communication frequency band, wherein said method comprises the steps of:

scanning said radio frequency band by either said first and second unit for the detection of the presence of interference prior to the start of the radio communication, and establishing communication between said first and second unit over any part of said radio frequency band comprising said communication frequency band dependent whether the presence of interference detected at such part being below a level suitable for communication, wherein a plurality of carrier frequency positions are defined within said radio frequency band, the spacing between at least part of adjacent carrier frequency positions being smaller than said communication frequency band, wherein said radio frequency band is scanned at said carrier frequency positions and communication is established by positioning the carrier frequency of said communication frequency band at a carrier frequency position corresponding to part of said radio frequency band available for communication and comprising said communication frequency band.

2. A method according to claim 1, further comprising the steps of:

scanning said radio frequency band by either said first and second unit for the detection of the presence of interference while communication between said first and second unit is in progress, establishing said communication in progress at any other part of said radio frequency band comprising said communication frequency band if said communication can be carried out with a substantially increased performance over said other part of said radio frequency band.

3. A method according to claim 1, wherein said radio frequency band is continuously scanned to provide information on the momentary status of the interference at said radio frequency band and the part or parts thereof available for communication.

4. A method according to claim 1, wherein the spacing between adjacent carrier frequency positions is substantially equal to the smallest communication frequency band of radio technologies to be used in said radio frequency band.

5. A method according to claim 1, wherein a plurality of interference levels is defined ranging upwards from at least a lower first level of interference to an increased second level of interference respectively, and wherein communication is directly established over part of said radio frequency band if the interference in said part is below said first level of interference.

6. A method according to claim 1, wherein said scanning step comprises the measurement of either signal strength and RF energy.

7. The method according to claim 1, wherein any available bandwidth within the radio frequency band may be assigned for communication purposes, and
wherein the radio frequency band is not segregated into predefined channel boundaries.

8. A method according to claim 1, wherein said first unit is a base unit and said second unit is a remote unit of an arrangement for cordless telecommunication, in particular a cordless telephone arrangement, said arrangement comprising a plurality of base units and a plurality of remote units, each base unit and each remote unit are arranged for establishing communication by exchanging operating information, wherein said base and remote unit interrogate said radio frequency band for the presence of said operating information.

9. A method according to claim 8, wherein each base unit and each remote unit are arranged for establishing communication over a plurality of communication channels in a communication frequency band, said communication channels are time-slots in a repeated time frame, and wherein said scanning for interference and said interrogation for operating information is carried out at different points in time corresponding to the time-slots of said repeated time frame.

10. A method for radio communication in a predetermined radio frequency band between a first transceiver unit and a second transceiver unit. said units being arranged to transmit and receive over a communication frequency band modulated at a carrier frequency, said radio frequency band having a frequency bandwidth which is larger than said communication frequency band, wherein said method comprises the steps of:
scanning said radio frequency band by either said first and second unit for the detection of the presence of interference prior to the start of the radio communication, and
establishing communication between said first and second unit over any part of said radio frequency band comprising said communication frequency band dependent whether the presence of interference detected at such part being below a level suitable for communication,
wherein a plurality of interference levels is defined ranging upwards from at least a lower first level of interference to an increased second level of interference respectively, and
wherein communication is directly established over part of said radio frequency band if the interference in said part is below said first level of interference, and
wherein communication is established over part of said radio frequency band last scanned if the interference in said radio frequency band is above said first level of interference and below a predetermined second level of interference.

11. An arrangement for radio communication in a predetermined radio frequency band, comprising a first transceiver unit and a second transceiver unit, said units being arranged to transmit and receive over a communication frequency band modulated at a carrier frequency, scanning means in either one of said units for detecting the presence of interference in said radio frequency band prior to establishing communication between said units, and control means for establishing communication between said first and second unit dependent whether the presence of interference detected at such part being below a level suitable for communication, wherein said control means and transceiver units are arranged for establishing communication between said first and second transceiver unit over any part of said radio frequency band comprising said communication frequency band,
wherein said scanning means are arranged for scanning said radio frequency band at a plurality of predetermined frequency positions, the spacing between at least part of adjacent frequency positions being smaller than said communication frequency band , and wherein said control means are arranged for establishing communication by positioning the carrier frequency of said communication frequency band at any frequency position corresponding to part of said radio frequency band available for communication and comprising said communication frequency band.

12. An arrangement according to claim 11, wherein said scanning means are arranged for scanning said radio frequency band for the detection of the presence of interference while communication between said first and second transceiver unit is in progress, and wherein said control means are arranged for establishing communication between said first and second transceiver unit at any other part of said radio frequency band if said communication can be carried out with a substantially increased performance over said other part of said radio frequency band.

13. An arrangement according to claim 11, wherein said scanning means are arranged for continuously scanning said radio frequency band and are coupled to means for providing information on the momentary status of the interference at said radio frequency band and the part or parts thereof available for communication.

14. An arrangement according to claim 11, wherein the spacing between adjacent frequency positions is substantially equal to the smallest communication frequency band of radio technologies to be used in said radio frequency band.

15. An arrangement according to any of the claim 11, wherein a plurality of interference levels is defined ranging upwards from at least a low first level of interference to an increased second level of interference respectively, and wherein said control means are arranged for directly establishing communication over part of said radio frequency band if the interference in said part is below said first level of interference.

16. The arrangement according to claim 11, wherein any available bandwidth within the radio frequency band may be assigned for communication purposes, and
wherein the radio frequency band is not segregated into predefined channel boundaries.

17. An arrangement according to claim 11, wherein said first transceiver unit is a base unit and said second transceiver unit is a remote unit of an arrangement for cordless telecommunication, in particular a cordless telephone arrangement, said arrangement comprising a plurality of base units and a plurality of remote units, the control means of each base unit and each remote unit are arranged for establishing communication by exchanging operating information, and wherein the scanning means of said base and remote unit are arranged to interrogate said radio frequency band for the presence of said operating information.

18. An arrangement according to claim 17, wherein each base unit and each remote unit are arranged for establishing communication over a plurality of communication channels in said communication frequency band, said communication channels are time-slots in a repeated time frame, and wherein said scanning means are arranged for scanning and interrogating said frequency positions in said radio frequency band at different points in time corresponding to the time-slots of said repeated time frames.

19. An arrangement for radio communication in a predetermined radio frequency band, comprising a first transceiver unit and a second transceiver unit, said units being arranged to transmit and receive over a communication frequency band modulated at a carrier frequency, scanning means in either one of said units for detecting the presence of interference in said radio frequency band prior to establishing communication between said units, and control means for establishing communication between said first and second unit dependent whether the presence of interference detected at such part being below a level suitable for communication, wherein said control means and transceiver units are arranged for establishing communication between said first and second transceiver unit over any part of said radio frequency band comprising said communication frequency band, wherein a plurality of interference levels is defined ranging upwards from at least a low first level of interference to an increased second level of interference respectively, and wherein said control means are arranged for directly establishing communication over part of said radio frequency band if the interference in said part is below said first level of interference, and wherein said control means are arranged for establishing communication over part of said radio frequency band last scanned if the interference in said radio frequency band is above said first level of interference and below said second level of interference.

* * * * *